United States Patent
Sterki

[11] 3,873,916
[45] Mar. 25, 1975

[54] CAPACITIVE SENSOR FOR MEASURING DISPLACEMENT OR POSITION

[75] Inventor: Armin Sterki, Thalwil, Switzerland

[73] Assignee: Maag Gear-Wheel & Machine Company Limited, Zurich, Switzerland

[22] Filed: Sept. 7, 1973

[21] Appl. No.: 395,132

[30] Foreign Application Priority Data
Sept. 7, 1972  Switzerland............. 13173/72

[52] U.S. Cl............................................. 324/61 R
[51] Int. Cl............................................. G01r 27/26
[58] Field of Search..... 324/61 R, 61 P; 340/258 C; 317/246

[56] References Cited
UNITED STATES PATENTS

| | | |
|---|---|---|
| 2,925,590 | 2/1960 | Boltinghouse et al............. 324/61 P |
| 3,012,189 | 12/1961 | Doll.............................. 324/61 R X |
| 3,121,839 | 2/1964 | Malenick et al.................. 324/61 P |
| 3,146,394 | 8/1964 | Frisch............................ 324/61 P |
| 3,219,925 | 11/1965 | Borley et al..................... 324/61 P |
| 3,222,591 | 12/1965 | Mynall.......................... 324/61 R X |
| 3,242,399 | 3/1966 | Frisch............................ 324/61 P |
| 3,515,987 | 6/1970 | Zurbrick et al................... 324/61 R |
| 3,723,866 | 3/1973 | Michaud et al................... 324/61 R |

*Primary Examiner*—Stanley T. Krawczewicz
*Attorney, Agent, or Firm*—Toren, McGeady and Stanger

[57] ABSTRACT

A scale reading apparatus operating by capacitive sensing of a scale position is provided with at least one electrical screening layer adjacent the conductive patterns that provide the capacitance measurements, but electrically insulated therefrom, the screening layer being arranged to act to screen stray capacitances. Each screening layer is preferably given a form similar to that of the conductive pattern relative to which it is fixed but 180° of phase therewith.

12 Claims, 13 Drawing Figures

3,873,916
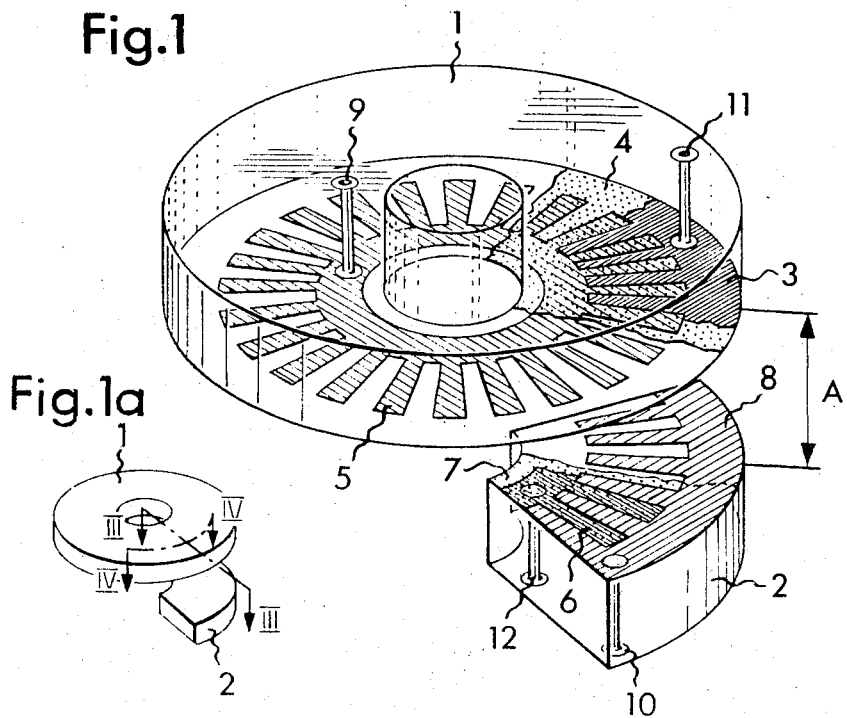
Fig.1
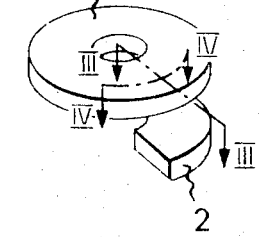
Fig.1a
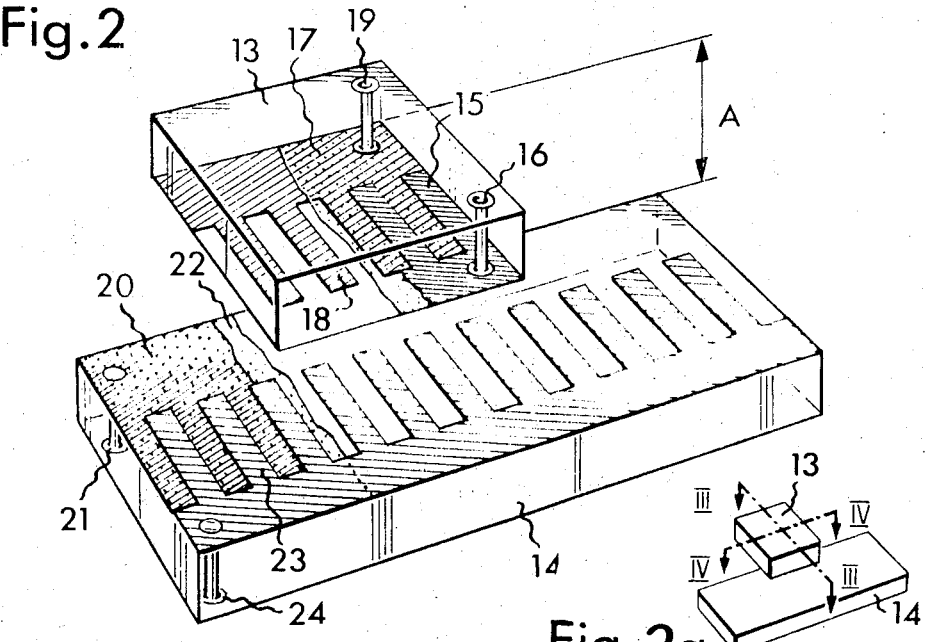
Fig.2
Fig.2a

CAPACITIVE SENSOR FOR MEASURING DISPLACEMENT OR POSITION

BACKGROUND OF THE INVENTION

The invention relates to scale reading apparatus for circular and for linear scales, employing capacitive sensing of the scale position wherein relatively movable parts each have an electrically conducting pattern disposed thereon.

In such apparatus, each pattern is generally applied to a glass substrate as a thin metal layer by vapour deposition with the aid of masks; a scaler pattern thus formed is sensed by a second pattern which is movable in relation to the first pattern. When the patterns are incorporated into an electrical circuit and move in relation to one another, there are set up electrically measurable capacitance changes which are proportional to the movement within certain limits and which can be evaluated by known electronic methods for the incremental measurement of angles and lengths.

However, in apparatus of this kind the sensitivity of such apparatus is low owing to the relatively large stray capacitances and is therefore insufficient for extremely accurate circular and longitudinal measurements, such as are required, for example, in the construction of measuring instruments.

An object of the invention is substantially to improve the sensitivity of such capacitive sensing methods and thus substantially to enhance the accuracy obtainable, more particularly in measuring instruments.

In accordance with the invention, this is achieved by virtue of the fact that at least one electrically conducting layer electrically insulated from the two patterns and held at a predetermined electrical potential is disposed as an electrical screen for the stray capacitances set up between the relatively movable patterns.

BRIEF DESCRIPTION OF THE DRAWINGS

The invention will be more particularly described by way of example with reference to the accompanying diagrammatic drawings, in which:

FIG. 1 illustrates a circular measuring apparatus according to the invention,

FIG. 1a is a thumbnail sketch of the apparatus in FIG. 1,

FIG. 2 illustrates a rectilinear measuring apparatus according to the invention, FIG. 2a is a thumbnail sketch of the apparatus in FIG. 2.

DESCRIPTION OF PREFERRED EMBODIMENTS

Figure 3:
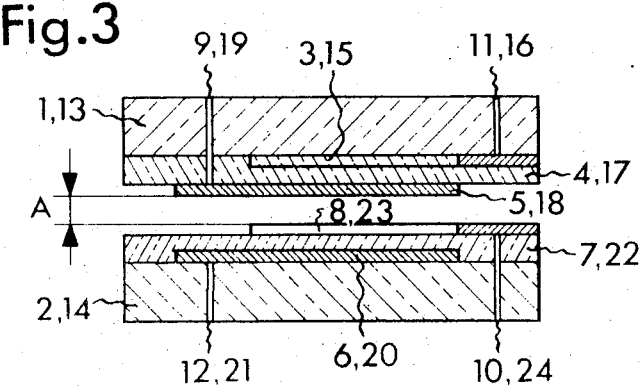
FIG. 3 is a cross-section along the line III—III in FIG. 1a or FIG. 2a, both figures giving a corresponding cross-sectional view.

The circular measuring apparatus illustrated in FIG. 1 comprises two members of glass or other electrically insulating and preferably transparent material, namely a movable part 1 and a fixed part 2. The movable part 1 is arranged to be freely rotatable at a predetermined distance A from the fixed part 2 and exactly centered in relation thereto, e.g. by means of a rolling bearing B (FIG. 6) mounted on a fixed hub H. A screen pattern 3, an insulation layer 4 and a scalar pattern 5 are applied in that order to the movable part 1 by vapour deposition techniques using the thin film method. A screen pattern 6, an insulation layer 7 and a scalar pattern 8 are similarly applied to the fixed part 2. The scalar pattern 5, comprising a series of radially directed equispaced bars connected at their radially inner ends by an annular portion, is electrically connected to a terminal connecting member 9 on the movable part 1, and the scalar pattern 8, which is composed similarly to the pattern 5 and with the bars at the same angular spacing but which occupies only a segment of a circle, is electrically connected to a terminal connecting member 10 on the fixed part 2. On the movable part 1, the screen 3 is electically connected to a terminal connecting member 11, and on the fixed part 2 the screen 6 is electrically connected to a terminal connecting member 12.

The rectilinear measuring apparatus illustrated in FIG. 2 is directly analogous in its construction to the circular apparatus of FIG. 1 and comprises of two glass bodies having thin film layers applied by vapour deposition techniques as in that first embodiment. A movable part 13 is exactly positioned above a fixed part 14 at the fixed distance A in such manner now as to be freely displaceable in the longitudinal direction of the fixed part.

The thin film layers on the movable part 13 are, a screen pattern 15, electrically connected to a terminal connecting member 16, an insulation layer 17, and a scalar pattern 18 comprising a series of parallel bars interconnected at one end and electrically connected to a terminal connecting member 19. On the fixed part 14 there are, a screen pattern 20 electrically connected to a terminal connecting member 21, an insulation layer 22, and a scalar pattern 23 electrically connected to a terminal connecting member 24.

The bars of the relatively movable scalar patterns 5 and 8 (FIG. 1), as well as those of the relatively movable scalar patterns 18 and 23 (FIG. 2), may be regarded as small plate condensers having a constant plate spacing A, but a variable overlap area. As is indicated by FIG. 3, which represents a cross-sectional view of either of these embodiments and carries the reference numbers of both, the two embodiments are essentially electrical equivalents of each other.

The capacitance values measurable across the electrical terminal connecting members 9 and 10, or 19 and 24 respectively, depend upon the relative positions of the movable scalar pattern 5 or 18 to the fixed scalar pattern 8 or 23 respectively. The screens 3 and 6, or 15 and 20 respectively, with their electrical connecting members 11 and 12, or 16 and 21 respectively, which are at earth potential, produce in combination with the form of electrical connection, which will hereinafter be described, a considerable reduction of stray capacitances. In this way, the sensitivity of the arrangement is substantially improved in relation to that of known sensing methods.

The sensitivity is here defined as the ratio of the maximum capacitance (when the bars of the movable scalar pattern 5 or 18 are in overlapping registration with those of the fixed scalar pattern 8 or 23 respectively) to the minimum capacitance (when the bars of the movable scalar pattern 5 or 18 are out of phase by half a bar pitch to the bars of the fixed scalar pattern 8 or 23 respectively).

On each body, the screen pattern is fixed in position relative to the scalar pattern and there will therefore be a constant capacitance effect between them. The formation of the screens 3, 15, 6 and 20 as patterns having the same bar configuration as the scalar patterns 5, 18, 8 and 23 respectively is to ensure that the constant capacitance between each scalar pattern and its associated screen is low but that the screening of stray capacitances is as effective as possible. Alternatively, the screens may be given other forms, e.g. as continuous thin metal layers so that they have, for example, an annular form with the same inner and outer radii but without the spaced bar pattern, the screens in the embodiment of FIG. 2 being, analogously, of simple rectangular quadrilateral form. In this case, correspondingly higher constant capacitances must be accepted. In certain circumstances, one of the screens can be omitted from the apparatus, e.g. that on the smaller or movable part.

Figure 4:
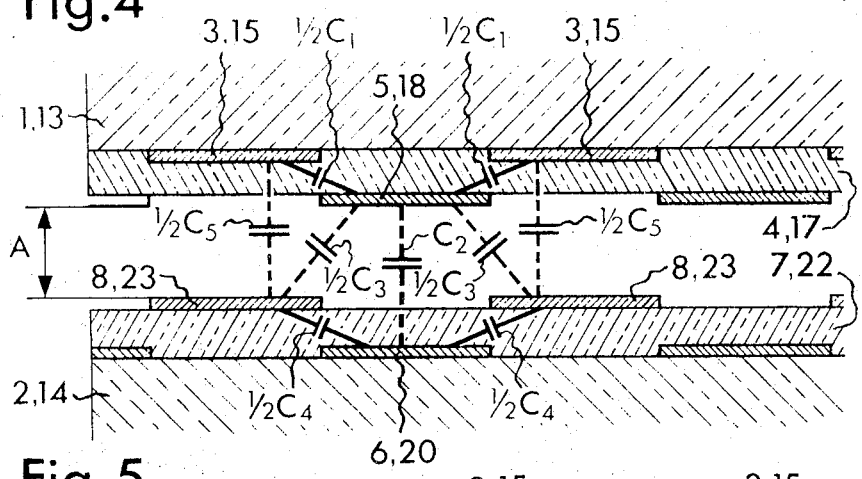
FIG. 4 is a cross-section along the arcuate or straight line IV—IV in FIGS. 1a and 2a respectively, both figures giving a corresponding cross-sectional view here also.
Figure 5:
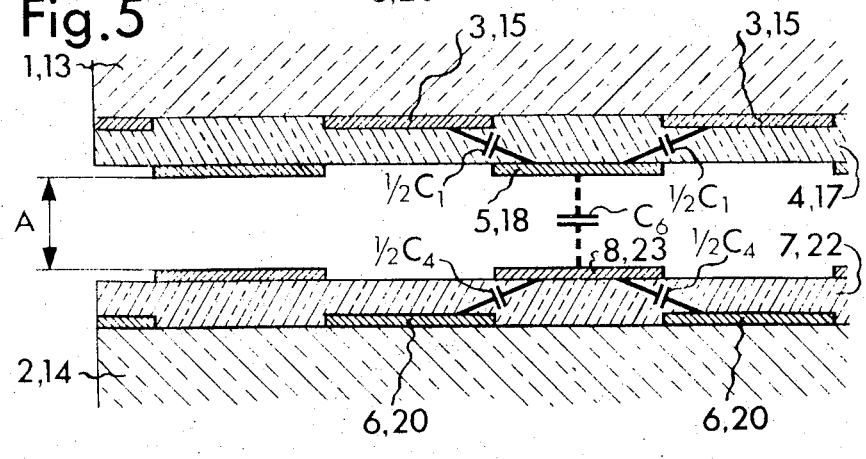
FIG. 5 is a cross-sectional view similar to that of FIG. 4, but in which the relative position between the two scalar parts of the apparatus has been shifted through a half-division in relation to the position shown in FIG. 4.

In FIGS. 4 and 5, there are shown the component capacitances which exist between a bar of the movable scalar pattern 5 or 18, its associated screen 3 or 15, the fixed scalar pattern 8 or 23 and its associated screen 6, 20. FIG. 4 shows the bars of the patterns 5 or 18 and 8 or 23 180° out of phase and FIG. 5 shows them coincident.

Referring first to FIG. 4, this shows the component capacitances present, as follows:

$C_1$ is the capacitance between a bar of the scalar pattern 5 or 18 and the earthed screen 3 or 15; $C_1$ is independent of the displacement of the movable pattern or of the phase difference between the fixed and movable patterns.

$C_2$ is the capacitance between a bar of the scalar pattern 5 or 18 and the screen 6 or 20; $C_2$ is a function of the displacement and of the phase difference.

$C_3$ is the capacitance between a bar of the scalar pattern 5 or 18 and the adjacent bars of the scalar pattern 8 or 23; $C_3$ is a function of the displacement and of the phase difference.

$C_4$ is the capacitance between two neighbouring bars of the scalar pattern 8 or 23 and the screen 6 or 20; $C_4$ is independent of the displacement or of the phase difference.

$C_5$ is the capacitance between the bars of the fixed scalar pattern 8 or 23 and the earthed screen 3 or 15 on the displaceable part 1 or 13; $C_5$ is a function of the displacement and of the phase difference.

As compared with the condition shown in FIG. 4, FIG. 5 illustrates the component capacitances with the bars of the two scalar patterns in the overlapping position, i.e., after 180° phase shift, with the following effects:

$C_1$ and $C_4$ have not been changed by the relative displacement;

$C_6$ is the capacitance between a bar of the movable scalar pattern 5 or 18 and the opposite bar of the fixed scalar pattern 8 or 23; $C_6$ is a function of the displacement and of the phase difference.

Thus, as a result of the relative displacement through half a pattern repeat, the component capacitances have changed from $C_1$, $C_2$, $C_3$, $C_4$, and $C_5$ (as shown in FIG. 4) to $C_1$, $C_4$ and $C_6$ (as shown in FIG. 5).

Figure 6:
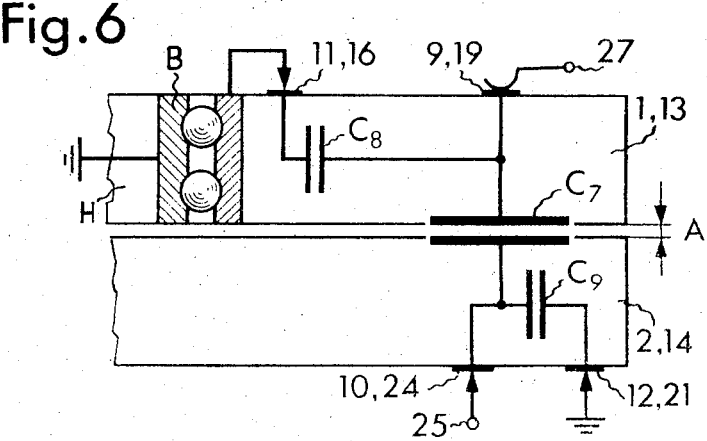
FIG. 6 is a cross-sectional view similar to that in FIG. 3, of apparatus according to the invention.

In FIG. 6, the component capacitances are represented in a combined form as:

a. the bar capacitance $C_7$ formed by the component capacitances present between the bars of the scalar patterns;

b. The screening capacitance $C_8$ of the displaceable part 1 or 13 formed by the component capacitances between the bars of the scalar pattern 5 or 18 and the earthed screens 3 or 15, and 6 or 20;

c. the screening capacitance $C_9$ of the fixed part 2 or 14 formed by the component capacitances between the bars of the scalar pattern 8 or 23 and the earthed screens 6 or 20 and 3 or 15.

The screening capacitance $C_8$ is connected, as shown in FIG. 6, to the terminal connecting member 11 or 16 which is earthed through the bearing B of the movable part and the screening capacitance $C_9$ is connected to the terminal connecting member 12 or 21 which is itself earthed. (The details of the machine or instrument in which the reading apparatus is employed and on which the bearing B is mounted are entirely conventional and do not therefore need to be particularised.) The terminal connecting members 11 or 16 and 12 or 21 can thus be regarded as a single terminal since they are both at the same potential.

The capacitances $C_7$, $C_8$ and $C_9$ shown in FIG. 6 are each a function of the movement and of the phase difference of the relatively movable parts. Thus, with the bars of the scalar patterns in the relative positions shown in FIG. 4:

$$C_7 = C_3$$
$$C_8 = C_1 + C_2$$
$$C_9 = C_4 + C_5$$

whereas, with the bars of the scalar patterns in the relative positions shown in FIG. 5:

$$C_7 = C_6$$
$$C_8 = C_1$$
$$C_9 = C_4$$

Figure 7:
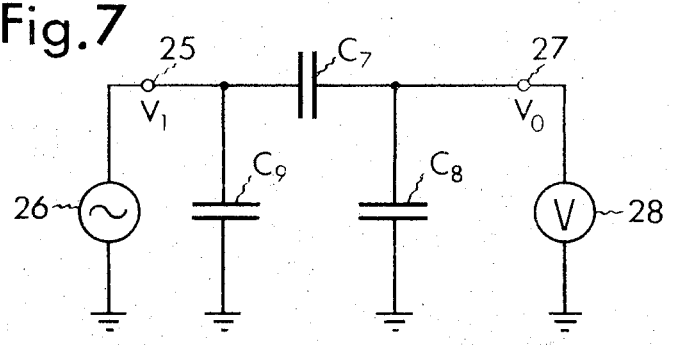
FIG. 7 shows the equivalent electric circuit of the apparatus of the preceding figures, operated with a voltage generator.

FIG. 7 shows a complete equivalent electrical circuit of the arrangement illustrated in FIG. 6, and wherein a low-resistance voltage generator 26 is connected to a fixed contact 25, and a voltmeter 28 or a measuring circuit sensitive to voltage amplitude is connected to a sliding contact 27 engaging the terminal connecting member 9 or 19 on the movable part.

Figure 8:
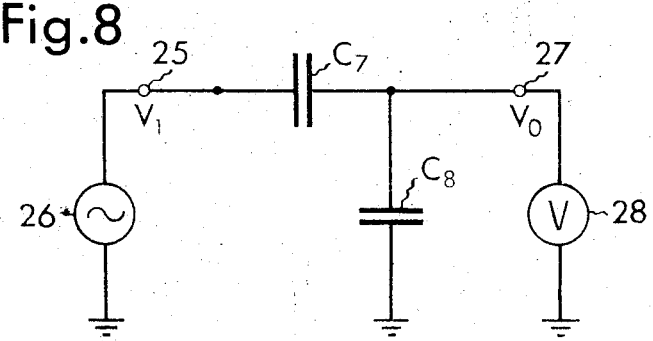
FIG. 8 shows a simplified equivalent electric circuit derived from FIG. 7.

The voltage generator 26 supplies to the fixed contact 25 a fixed frequency voltage $V_1$ which is independent of the load. The combined capacitance $C_9$ can thus be omitted: the equivalent circuit is simplified to that shown in FIG. 8 where the capacitances $C_7$ and $C_8$ remain. The two capacitances $C_7$ and $C_8$ are each a function of the displacement and of the phase difference of the relatively movable parts.

In general, the output voltage $V_o$ at the sliding contact 27 becomes $$V_O = V_1 \; C_7/C_7 + C_8$$

The output voltage $V_O$ is measured at the sliding contact 27 by an amplitude sensitive measuring circuit 28 having high input impedance. The capacitances $C_7$ and $C_8$ constitute a capacitive voltage divider. $C_7$ and $C_8$ are dependent upon the relative positions of the scalar patterns 5 or 18 and 8 or 23, and consist of the bar capacitances of the scalar patterns 5 or 18 and 8 or 23 and of the screens 3 or 15 and 6 or 20.

The amplitude of the output voltage is porportional to the relative positions of the bars of the patterns 5 or 18 and 8 or 23 within a pattern division, and the number of maximum and minimum values passed through in a scalar measurement is equal to the number of pattern divisions passed through. By counting of the minimum or maximum values and, if desired, by measurement of the amplitude of the output voltage $V_O$ the scalar measurement (angle or length) can be digitally indicated.

With the bars of the scalar patterns 5 or 18 and 8 or 23 in the relative positions shown in FIG. 4, the output voltage $V_{o1}$ at the sliding contact 27, expressed in component capacitances, becomes:

$$V_{o1} = V_1 \; C_3/C_3 + C_1 + C_2$$

With the bars in the relative positions shown in FIG. 5, the output voltage $V_{o2}$ at the sliding contact 27, expressed in component capacitances, becomes:

$$V_{o2} = V_1 \; C_6/C_6 + C_1$$

The relative shift of the scalar patterns 5 or 18 and 8 or 23 through a half-division (as shown in FIGS. 4 and 5) gives rise to this change of output voltage at the sliding contact 27 from $V_{o1}$ to $V_{o2}$. The ratio of the two output voltages $V_{o1}$ and $V_{o2}$ is a measure of the sensitivity of the arrangement:

$$\text{Sensitivity} = \frac{V_{02}}{V_{01}} = \frac{\frac{C_6}{C_6+C_1}}{\frac{C_3}{C_3+C_1+C_2}}$$

Figure 9:
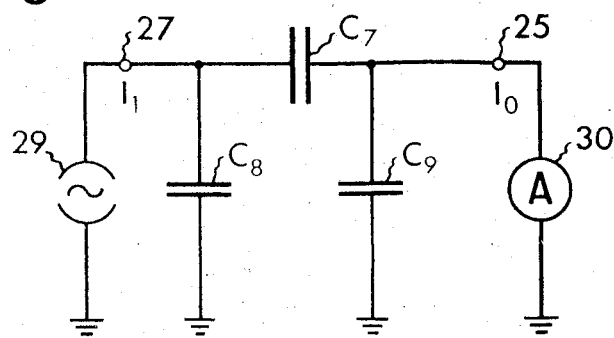
FIG. 9 shows the equivalent electric circuit of the apparatus of FIGS. 1 to 6, operated with a current generator.

The same sensitivity result is obtained if — as shown by the equivalent circuit of FIG. 9 — there is connected to the sliding contact 27 a high-resistance current generator 29 which supplies a fixed frequency current $I_1$ independent of the load, and the output current $I_o$ is measured at the fixed contact 25 by means of an ammeter 30 or by a low-resistance current-amplitude-sensitive circuit.

Figure 10:
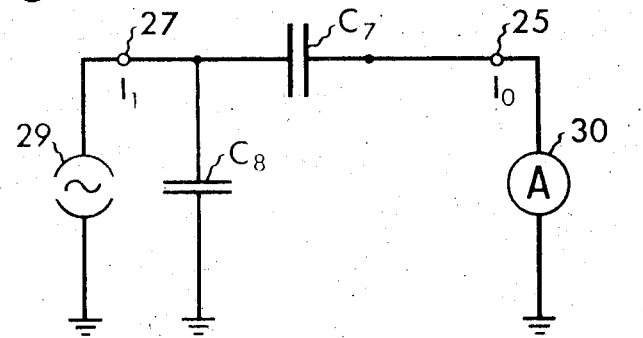
FIG. 10 shows a simplified equivalent electric circuit derived from FIG. 9.

If the internal resistance of the ammeter 30 is selected to be very low, $C_9$ can be ignored. The equivalent circuit is thereby simplified as shown in FIG. 10. Generally, then the output current becomes:

$$I_o = I_1 \; C_7/C_7 + C_8$$

With the scalar patterns in the relative positions shown in FIG. 4, the output current $I_{o1}$ at the fixed contact 25, expressed in component capacitances, becomes:

$$I_{oi} = I_1 \; C_3/C_3 + C_1 + C_2$$

With the patterns in the relative positions as shown in FIG. 5, the output current $I_{o2}$ at the fixed contact 25, expressed in component capacitances, becomes:

$$I_{o2} = I_1 \; C_6/C_6 + C_1$$

The ratio of the output currents $I_{o1}$, $I_{o2}$ is again a measure of the sensitivity of the arrangement:

$$\text{Sensitivity} = \frac{I_{02}}{I_{01}} = \frac{\frac{C_6}{C_6+C_1}}{\frac{C_3}{C_3+C_1+C_2}}$$

The manner of operation of the incremental capacitive sensing of circular and longitudinal divisions will now be explained with reference to FIGS. 1 to 6 and to the equivalent electric circuits of FIGS. 7 to 10:

The quantity to be measured is fed to the movable part 1 for angular measurements and to the part 14 for length measurements. In the circular scale of FIG. 1, the rotatable part 1 is constructed as a disc and permits angular measurements over 360°, while the fixed part is constructed as a sector having any convenient arc length. In the linear scale of FIG. 2, the movable part 13 is given any desired length, while the fixed part 14 extends over the whole length to be measured.

The bars of the scalar pattern 5 or 18 on the movable part 1 or 13 form together with the bars of the scalar pattern 8 or 23 on the fixed part 2 or 14 small plate capacitors having a fixed plate spacing A but a variable plate overlap area. As a result of the rotation of the movable part 1 or the linear displacement of the movable part 13 in relation to the fixed part 2 or 14, respectively, the overlap area of the bars changes.

It is furthermore apparent from FIGS. 1 and 2 that all the bars of the scalar patterns 5 or 18 and 8 or 23 are electrically conductively connected to the electrical terminal connecting members 9 or 19 and 10 or 24.

The capacitance measurable between the electrical terminal connecting numbers 9 or 19 and 10 or 24 is the sum of all the bar capacitances between the scalar patterns 5 or 18 and 8 or 23. This capacitance is a minimum with the scalar patterns 5 or 18 and 8 or 23 in the relative positions shown in FIG. 4, and is a maximum with the scalar patterns 5 or 18 and 8 or 23 in the relative positions shown in FIG. 5. The capacitance measurable between the electrical terminal connecting members 9 or 19 and 10 or 24 thus varies with the relative displacement of the bar patterns 5 or 18 and 8 or 23 within a pattern division from said minimum value to said maximum value.

The number of minimum or maximum values through which the capacitance passes during a given displacement is equal to the number of pattern divisions passed through. If the number of pattern divisions passed through is multiplied by the pattern division constant (an angular value in the case of a circular scale and a length increment in the case of a linear scale) the magnitude of the angle of the rotation or the length of the linear displacement is obtained. The smaller the pattern division, and hence the smaller pattern division constant, the greater becomes the resolution of the sensing method.

Since the capacitance provided by the bars 5 or 18 and 8 or 23 within a pattern division is proportional to the relative positions of the patterns, a measurement of the capacitance in relation to the maximum or minimum value gives an extension of the resolution afforded by the method. In practical cases, the capacitance need not be directly measured but the output signal amplitude-modulated by the capacitance change will be evaluated.

Figure 11:
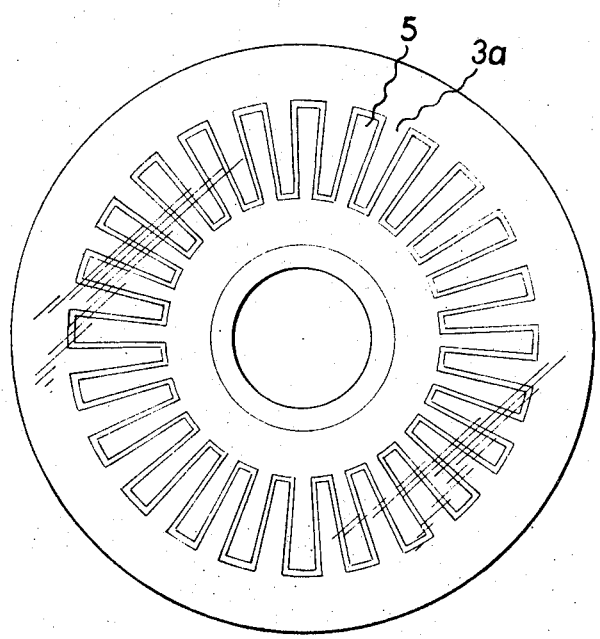
FIG. 11 illustrates a modification that can be employed in the apparatus of FIG. 1 or FIG. 2.

In another possible form of the screening indicated in FIG. 11 the screens again have a bar configuration but with a reduced bar width as compared with their associated scalar pattern. The screens can then be formed coplanar with their associated scalar pattern, with an interspacing resulting from the reduced bar width insulating each screen from its associated scalar pattern. In the circular scale in the example of FIG. 11, the bars of the screen scalar pattern 3a can be seen with its bars interposed between adjacent bars of the scalar pattern 5.

What I claim and desire to secure by letters Patent is:

1. Scale reading apparatus comprising, two relatively movable parts, respective electrically conductive scalar reading patterns on said parts the relative positions of which patterns determine a reading, said reading patterns being electrically unconnected but at a spacing that provides a capacitive effect between them, electrical supply means and sensing means connected to said patterns to generate signals indicative of said capacitance effect and to detect variations in said capacitive effect with relative movement between the parts, the apparatus further comprising a further electrically conducting scalar pattern arranged on one of said parts to be electrically insulated from said two scalar reading patterns, the further scalar pattern having a pattern pitch corresponding to that of the scalar reading pattern on said one of said parts and being disposed 180° out of phase thereto, means holding said further pattern at a predetermined electrical potential for operation of said further pattern as an electrical screen for the stray capacitances set up between said scalar patterns.

2. Apparatus according to claim 1 wherein said supply means is in the form of a voltage source and said sensing means is in the form of an evaluating circuit sensitive to voltage amplitude, the voltage source and the evaluating circuit being connected to the respective scalar reading patterns whereby said variations are detected by the evaluating circuit as voltage signals.

3. Apparatus according to claim 2 wherein said voltage source is a constant-frequency alternating voltage generator and said evaluating circuit is a voltage amplitude demodulation circuit having high input impedance for the measurement of the voltage signal amplitude-modulated by the capacitance change, with relative movement between said parts.

4. Apparatus according to claim 1 wherein said supply means is in the form of a current source and said sensing means is in the form of an evaluating circuit sensitive to current amplitude, the current source and the evaluating circuit being connected to the respective scalar reading patterns whereby said variations are detected by the evaluating circuit as current signals.

5. Apparatus according to claim 4 wherein said current source is a constant-frequency generator and said evaluating circuit is a current amplitude demodulation circuit having low input impedance for the measurement of the current signal amplitude-modulated by the capacitance change with relative movement between said parts.

6. Apparatus according to claim 1 wherein at least one of said relatively movable parts comprises a base or support substrate on which the screen is disposed between said substrate and said scalar reading pattern on said part.

7. Apparatus according to claim 1 wherein said scalar patterns are formed as thin vapor-deposited layers on their relatively movable parts and there is an additional thin vapor-deposited electrically insulating layer between said further electrically conducting scalar pattern and the scalar reading pattern of its relatively movable part to insulate said reading and further patterns from each other.

8. Scale reading apparatus comprising, in combination, two relatively movable parts, respective first layers of electrically conductive material on said parts, said first layers being in the form of respective scalar patterns the relative positions of which patterns determine a reading, said layers being electrically unconnected but at a spacing that provides a capacitive effect between them, electrical supply means and sensing means connected to said first conductive layers to generate signals indicative of said capacitance effect and to detect variations in said capacitive effect with relative movement between the parts, the apparatus further comprising an electrically insulating layer upon said first layer of at least one of said parts and a further electrically conductive layer disposed upon said insulating layer to be electrically insulated but close to the scalar pattern layer of said one part, and means to hold said further conductive layer at a predetermined electrical potential whereby said further layer acts as an electrical screen for the stray capacitances set up between said scalar patterns of the respective parts.

9. Apparatus according to claim 8 wherein each of the relatively movable parts is provided with an aforesaid insulating layer and further conductive layer, each said further conductive layer being in the form of a scalar pattern having the same pitch as the scalar reading pattern of its associated relatively movable part but being positioned 180° out of phase thereto.

10. Apparatus according to claim 8 wherein said screen is also formed as a scalar pattern.

11. Apparatus according to claim 10 wherein said screen pattern has a pitch corresponding to that of said scalar reading pattern on the associated relatively movable part and is disposed 180° out of phase thereto.

12. Apparatus according to claim 11 wherein the screen is formed in the same plane as said scalar reading pattern and the elements of the respective patterns on said part are interposed in alternation to each other but are spaced from each other.

* * * * *